(12) United States Patent
Magnetti et al.

(10) Patent No.: US 9,118,223 B2
(45) Date of Patent: Aug. 25, 2015

(54) ELECTRIC MOTOR

(71) Applicant: Johnson Electric S.A., Murten (CH)

(72) Inventors: Gian Carlo Magnetti, Asti (IT); Daniele Paolo Dal Colle, Asti (IT)

(73) Assignee: Johnson Electric S.A., Murten (CH)

( * ) Notice: Subject to any disclaimer, the term of this patent is extended or adjusted under 35 U.S.C. 154(b) by 394 days.

(21) Appl. No.: 13/750,260

(22) Filed: Jan. 25, 2013

(65) Prior Publication Data

US 2013/0193797 A1   Aug. 1, 2013

(30) Foreign Application Priority Data

Jan. 27, 2012   (IT) .............................. TO2012A0068

(51) Int. Cl.
*H02K 23/34* (2006.01)
*H02K 3/12* (2006.01)

(52) U.S. Cl.
CPC . *H02K 3/12* (2013.01); *H02K 23/34* (2013.01)

(58) Field of Classification Search
CPC ........ H02K 23/24; H02K 23/30; H02K 23/32
See application file for complete search history.

(56) References Cited

U.S. PATENT DOCUMENTS

| | | | | | |
|---|---|---|---|---|---|
| 1,628,611 | A | * | 5/1927 | Powell | 310/205 |
| 1,628,613 | A | * | 5/1927 | Powell | 310/205 |
| 1,685,738 | A | * | 9/1928 | Albrecht | 310/205 |
| 2,180,327 | A | * | 11/1939 | Wilber | 310/203 |
| 2,311,700 | A | * | 2/1943 | Schwarz | 310/225 |

* cited by examiner

*Primary Examiner* — Dang Le
(74) *Attorney, Agent, or Firm* — Muncy, Geissler, Olds & Lowe, P.C.

(57) ABSTRACT

A DC electric motor has a stack of laminations defining a rotor with at least two pairs of poles and an even number of slots at least equal to 8. The rotor also has a commutator with an even number of segments and a closed distributed rotor winding. The winding extends in the slots and is connected in a predetermined manner to the segments of the commutator. The rotor winding has a winding section of the lap type, connected to two consecutive segments of the commutator and, in series with this, a plurality of winding sections of the wave type. These winding sections all span an identical number of slots.

9 Claims, 4 Drawing Sheets

ELECTRIC MOTOR

CROSS REFERENCE TO RELATED APPLICATIONS

This non-provisional patent application claims priority under 35 U.S.C. §119(a) from Patent Application No. TO2012A000068 filed in Italy on Jan. 27, 2012.

FIELD OF THE INVENTION

This invention relates to a commutator-type direct current (DC) electric motor and in particular, to the rotor winding of such a motor.

BACKGROUND OF THE INVENTION

More specifically the subject of the invention is a DC motor of the type comprising a wound rotor with at least two pairs of poles, including a stack of laminations that defines an even number of slots, at least equal to 8, and associated with which are a commutator with an even number of segments and a closed distributed winding the wires of which extend in said slots and are connected in a predetermined manner to the segments of the commutator.

In prior art motors of this type, the winding of the rotor is typically of the lap type, or of the wave type.

The lap-type winding is generally preferred for low-voltage applications with high current intensities. This type of motor may be used, for example, as the motor of a radiator fan on a motor vehicle.

These types of motors entail the use of a large quantity of copper and of a high number of brushes and associated accessories in the brush-holder. Such a motor is therefore also relatively heavy.

Wave type windings have a limitation on the number of rotor teeth and commutator segments due to the winding sequence. The commutator pitch Yc must be equal to (C±1)/P where C is the number of segments and P is the number of pole pairs. For example, for a 4 pole motor having 18 segments, the equation gives Yc as (18±1)/2 or 17/2 or 19/2 which is not a whole number and thus can not be wound as a wave type winding.

However, a wave type winding can have certain benefits over a lap type winding in terms of weight and construction for motors with more than one pair of poles, e.g. 4 poles, 6 poles, 8 poles, etc.

SUMMARY OF THE INVENTION

Hence there is a desire for a motor with a rotor wound in manner similar to a wave winding on a rotor core having a number of teeth or commutator segments which is not compatible with a true wave winding.

Accordingly, in one aspect thereof, the present invention provides a direct current electric motor with at least two pairs of poles, comprising: a rotor including a stack of laminations that defines an even number of slots at least equal to 8, a commutator with an even number of segments, and a closed distributed rotor winding, the wire of which extends in said slots and is connected in a predetermined manner to the segments of the commutator; and brush gear for transferring electrical power to the rotor winding via the commutator, wherein the rotor winding comprises a single winding section of the lap type, connected to two consecutive segments of the commutator and, in series with this, a plurality of winding sections of the wave type, said winding sections all spanning an identical number of slots.

Preferably, the winding section of the lap type is the first that is formed when making the winding of the rotor.

Preferably, the motor has two pairs of poles, eighteen slots, and eighteen segments and each winding section of the rotor winding spans three slots.

Preferably, the brush-gear has only two brushes cooperating with the commutator.

Preferably, the winding comprises a single insulated wire.

Preferably, the number of segments is equal to the number of slots of the rotor.

Preferably, the number of winding sections is equal to the number of segments.

Preferably, the number of lap type winding sections is one.

From a manufacturing point of view, it is particularly suitable for the aforesaid winding section of the lap type to be the first that is formed when making the winding of the rotor.

In one exemplary embodiment the motor has two pairs of poles, the rotor has eighteen slots, the commutator has eighteen segments and each section of the winding of the rotor spans three slots. The brush-holder in such a motor can be made with only two brushes cooperating with the commutator, reducing further to weight and material cost of the motor.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 4:
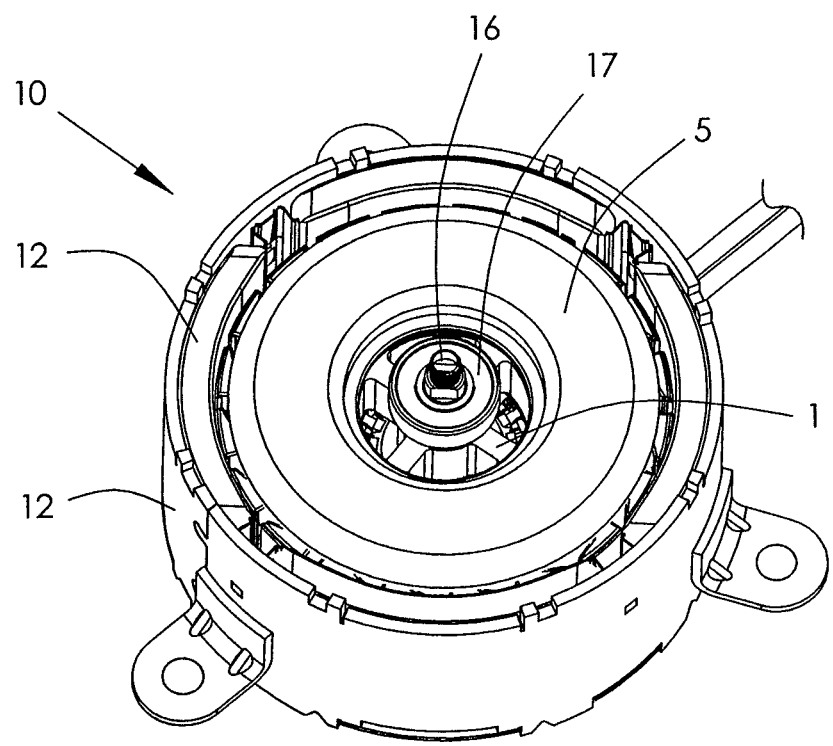
FIG. 4 is an assembled view of the motor incorporating the rotor of FIG. 1.

A DC motor 10 according to a preferred embodiment of the present invention is shown in FIG. 4. The motor 10 has a housing 12, shown with a cover or end cap removed to show the inside of the housing. Four magnets 14 are fixed to an inner surface of the housing to form four stator poles. The rotor 1 is rotatably disposed within the housing and has a shaft 16 mounted in bearings 17 (only one visible) fixed to the end caps of the housing.

Figure 1:
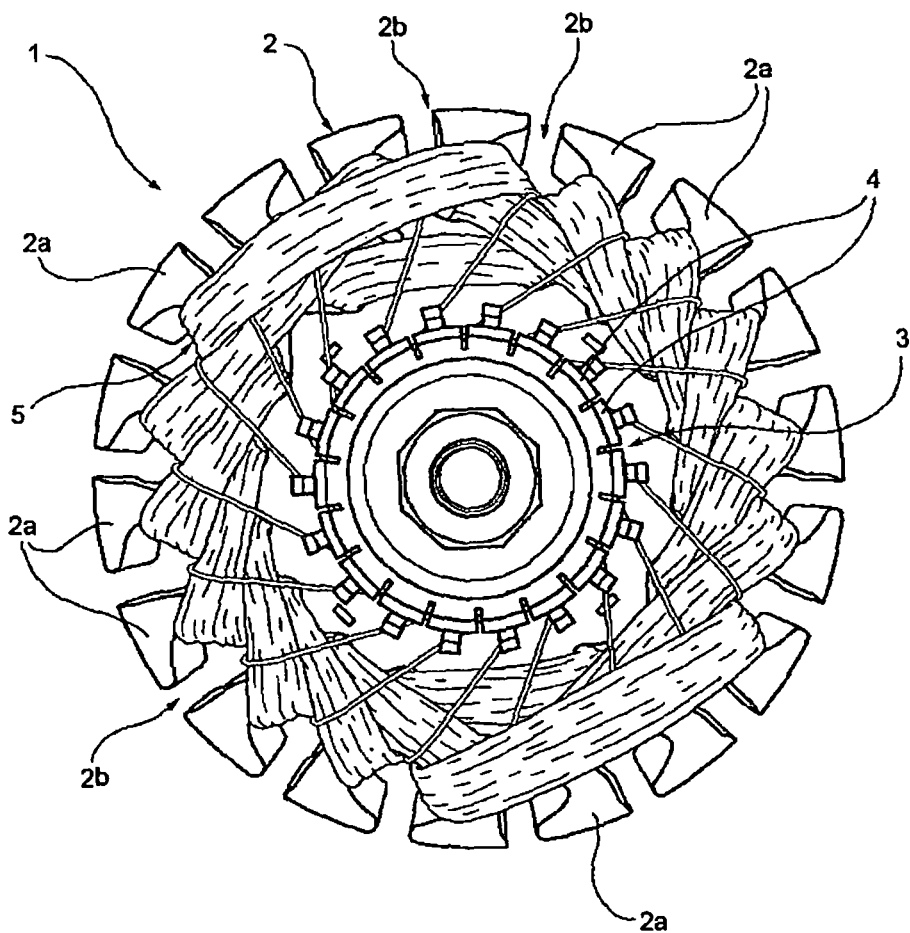
FIG. 1 is a perspective view of the rotor of a DC motor with commutator according to the preferred embodiment of the present invention.
Figure 2:
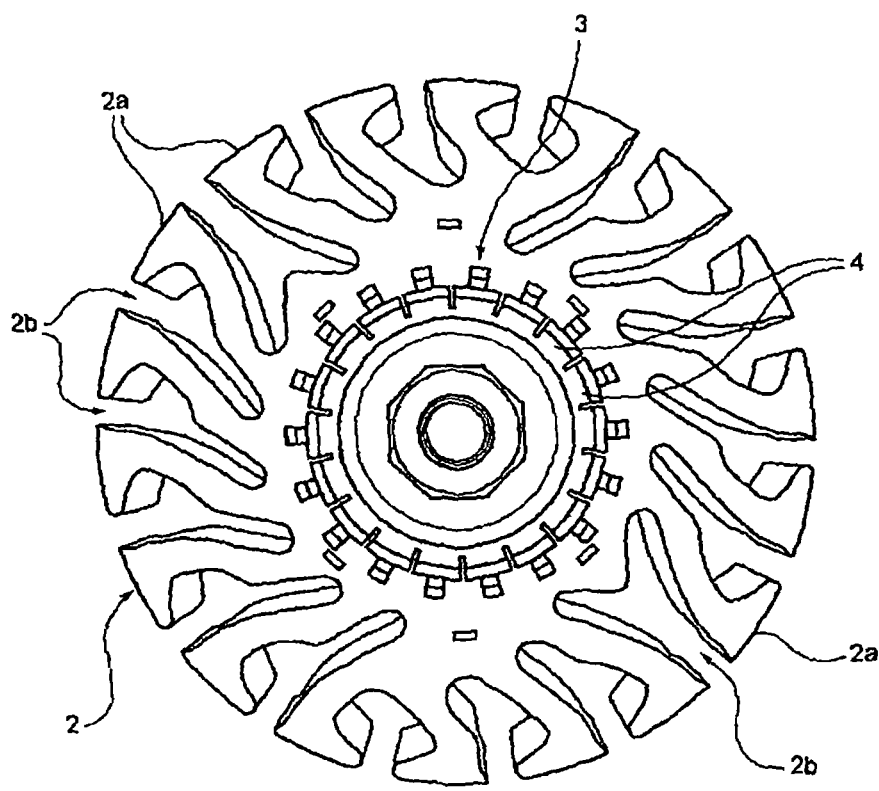
FIG. 2 is a view of the rotor to FIG. 1, with rotor windings removed.

The rotor 1 of the motor 10 is shown in more detail in FIG. 1. The rotor has a rotor core formed by a stack of laminations 2, which can be seen better in FIG. 2.

The stack of laminations 2 has an asymmetrical configuration. Moreover, the invention is not limited to such a configuration as the stack of laminations may have symmetrical configurations of a type known per se. The stack of laminations 2 in the embodiment shown, defines an even number of teeth 2a defined between which is an identical number of slots 2b. Peripherally the teeth 2a preferably have the same angular extension, and the same also applies to the slots 2b.

The rotor 1 also comprises a closed distributed winding, indicated as a whole by 5 in FIG. 1. This winding is formed by one insulated electric wire that extends in the slots 2b of the stack of laminations 2 and is connected in a predetermined manner to the segments 4 of the commutator 3.

Figure 3:
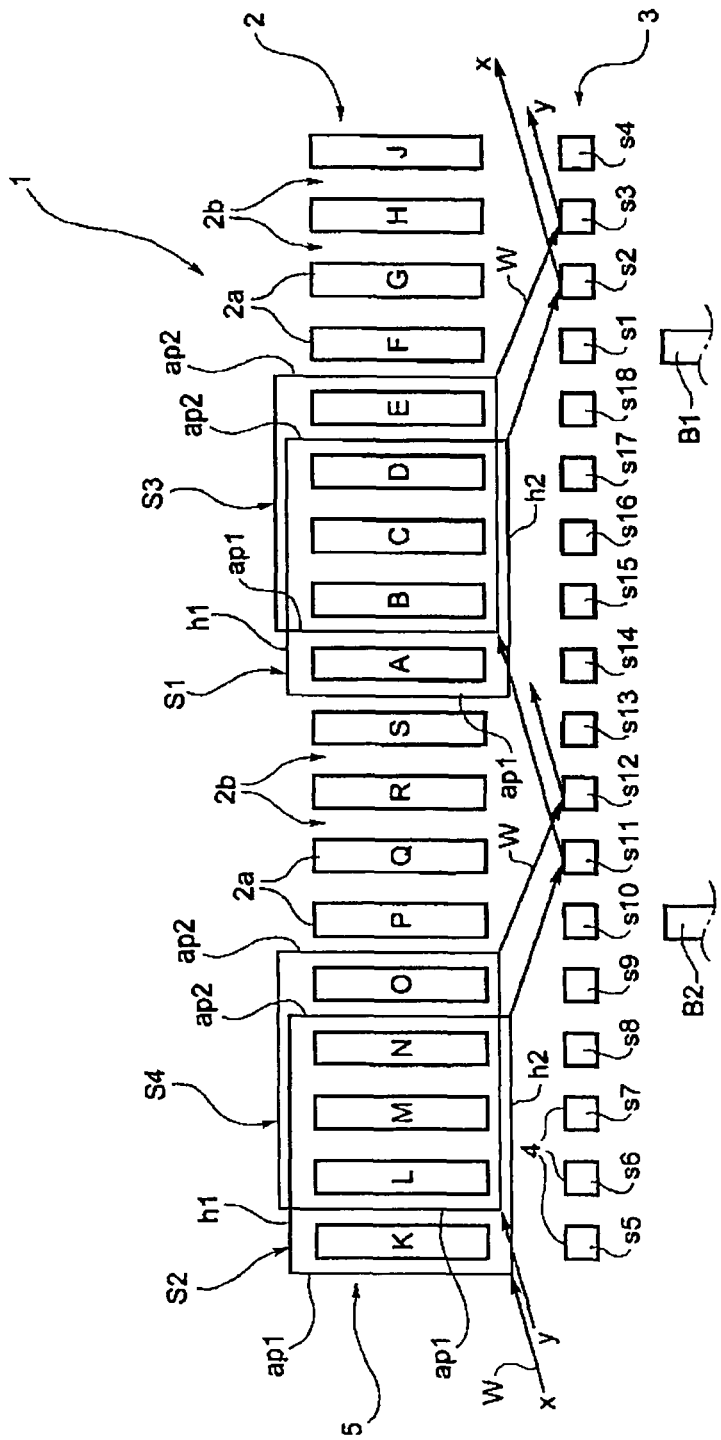
FIG. 3 is a linearized schematic diagram of the rotor of FIG. 1, illustrating an embodiment plan of the rotor winding.

FIG. 3 provides a schematic illustration of an embodiment of the winding 5 according to the invention. The diagram of FIG. 3 refers in particular to the rotor of an electric motor having two pairs of poles and in which the rotor has a rotor core formed by a stack of laminations 2 that defines eighteen teeth 2a, identified by the letters A to S, and with a commutator 3 that has eighteen segments 4, identified by the symbols s1 to s18.

In the exemplary embodiment of FIG. 3 the winding 5 is formed by an insulated wire W which, starting from the commutator segment indicated by s1 goes on to form a first winding section S1 of the lap type, for example, by forming ten turns around a set of teeth A-D of the stack of laminations 2 of the rotor. In particular, the turns in the winding section S1 comprise active portions, ap1 and ap2, that extend in the slots between the teeth S and A and between the teeth D and E, respectively, as well as portions of frontal connection or heads h1 and h2.

On completion of the lap-type section or winding S1 the wire W emerging from this winding section is connected to the commutator segment indicated by s2 and then goes on to form subsequent winding sections of the wave type.

In particular, with reference to FIG. 3, starting from the segment s2 of the commutator the conductor wire W goes on to form a second winding section S2 around the set of teeth K-N, with active portions ap1 and ap2 in the slots between the teeth I and K and, respectively, between the teeth N and O, and with frontal connections or heads, indicated once again by h1 and h2.

On completion of the winding section S2, the emerging conductor wire W is connected to the commutator segment indicated by s11, and continues from this to form a further winding section S3, also of the wave type. The winding section S3, like the sections S2 and S1, spans a group of four teeth B-E of the stack of laminations 2, and has active portions ap1 and ap2 that extend in the slots between the teeth A and B and, respectively, between the teeth E and F.

After leaving the winding section S3 the conductor wire W is connected to the segment s3 and goes on from here to form a next winding section S4, also of the wave type.

The winding section S4 also spans a group of four teeth L-O of the stack of laminations 2, and has active portions ap1 and ap2 that extend in the slots between the teeth K and L and, respectively, between the teeth O and P. After leaving the winding section S4, the wire W is connected to the segment s12 of the commutator.

The formation of the rotor winding 5 then continues with the formation of more winding sections of the wave type, with steps corresponding to those of the previous wave-type winding sections S2-S4, until the wire W once again reaches the commutator segment indicated by s1.

With the rotor winding 5 made in conformity with the diagram of FIG. 3, the brush-holder associated with the commutator 3 can be suitably made with only two brushes and associated accessories (guide casings, springs, connection plaits, etc.). This gives rise to a considerable economic saving and a reduction in weight.

Compared with a conventional winding entirely of the lap type, the rotor winding 5 of the present invention gives rise to a substantial saving of copper amounting to around 25% in weight. This translates into an appreciable economic advantage and a suitable reduction in weight.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

For example, although it is preferred that the winding be formed by a single wire, it could be made by two or more wires wound in parallel, or by two or more wires connected in series and extending between respective pairs of segments of the commutator.

The invention claimed is:

1. A direct current electric motor with at least two pairs of poles, comprising: a rotor including a stack of laminations that defines an even number of slots at least equal to 8, a commutator with an even number of segments, and a closed distributed rotor winding, the wire of which extends in said slots and is connected in a predetermined manner to the segments of the commutator; and
    brush gear for transferring electrical power to the rotor winding via the commutator,
    wherein the rotor winding comprises a single winding section of the lap type, connected to two consecutive segments of the commutator and, in series with this, a plurality of winding sections of the wave type, said winding sections all spanning an identical number of slots.

2. The motor of claim 1, wherein said winding section of the lap type is the first that is formed when making the winding of the rotor.

3. The motor of claim 1, wherein the motor has two pairs of poles, eighteen slots, and eighteen segments and each winding section of the rotor winding spans three slots.

4. The motor of claim 1, wherein the brush-gear comprises only two brushes cooperating with the commutator.

5. The motor of claim 1, wherein the winding comprises a single insulated wire.

6. The motor of claim 1, wherein the number of segments is equal to the number of slots of the rotor.

7. The motor of claim 1, wherein the number of winding sections is equal to the number of segments.

8. The motor of claim 7, wherein the number of winding sections is equal to the number of segments.

9. The motor of claim 1, wherein the number of lap type winding sections is one.

* * * * *